United States Patent
Frohlich et al.

[15] 3,675,680
[45] July 11, 1972

[54] JOINTED DELIVERY EQUIPMENT FOR FLUIDS, PARTICULARLY LOW TEMPERATURE LIQUIDS

[72] Inventors: Josef Frohlich, Dusseldorf-Rath, Germany; Jacob Leguyt, Dordrecht, Netherlands

[73] Assignee: Mannesmann Aktiengesellschaft, Dusseldorf, Germany

[22] Filed: Oct. 12, 1970

[21] Appl. No.: 79,992

[30] Foreign Application Priority Data

Jan. 13, 1970 Germany ............. P 20 02 147.0
Oct. 15, 1969 Germany ............. P 19 53 108.9

[52] U.S. Cl. .............. 137/615, 141/378, 248/49
[51] Int. Cl. ............................. B67d 5/00
[58] Field of Search ........... 137/615, 276; 248/49, 292; 141/378

[56] References Cited

UNITED STATES PATENTS

| | | | |
|---|---|---|---|
| 3,096,797 | 7/1963 | Bily | 137/615 |
| 2,368,994 | 2/1945 | McGarry | 137/276 |
| 3,085,593 | 4/1963 | Sorensen | 137/615 |
| 3,554,231 | 1/1971 | Caregnato | 137/615 |

FOREIGN PATENTS OR APPLICATIONS 1,289,223  5/1961  France .............. 137/615

Primary Examiner—M. Cary Nelson
Assistant Examiner—William H. Wright
Attorney—Smyth, Roston & Pavitt

[57] ABSTRACT

A tower-boom system for transfer of fluids in which the conduit means is relieved from bearing weight.

12 Claims, 13 Drawing Figures

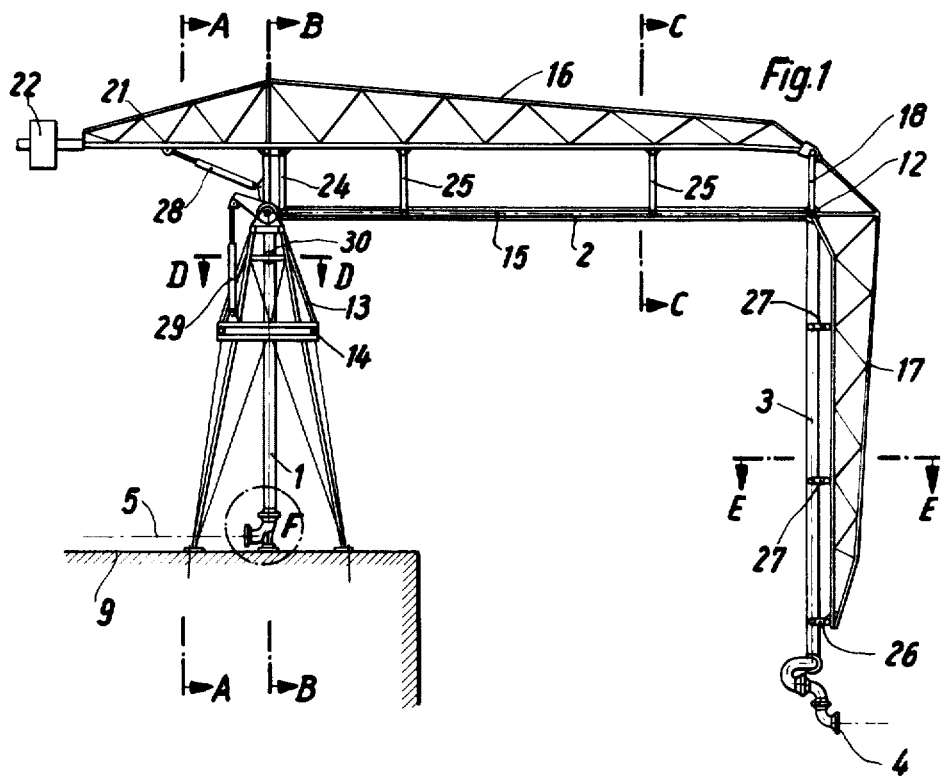
Fig. 1
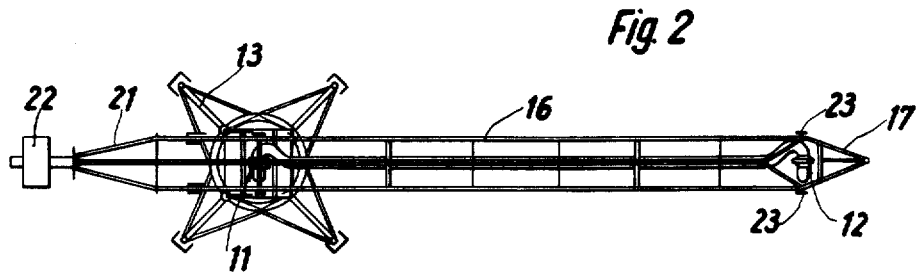
Fig. 2
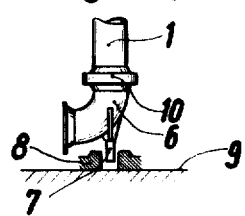
Fig. 4 (F)    Fig. 5 (D-D)

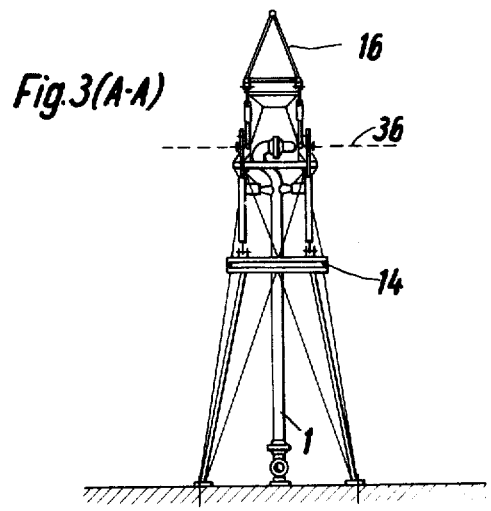
Fig.3(A-A)
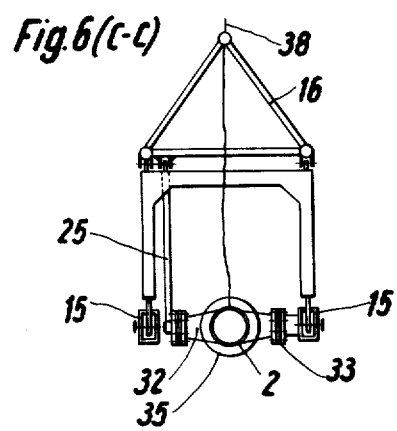
Fig.6(C-C)
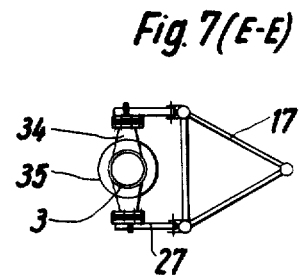
Fig.7(E-E)
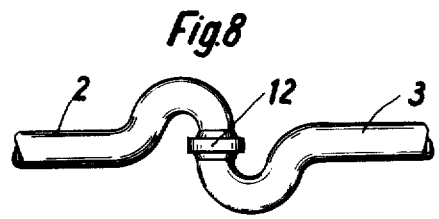
Fig.8

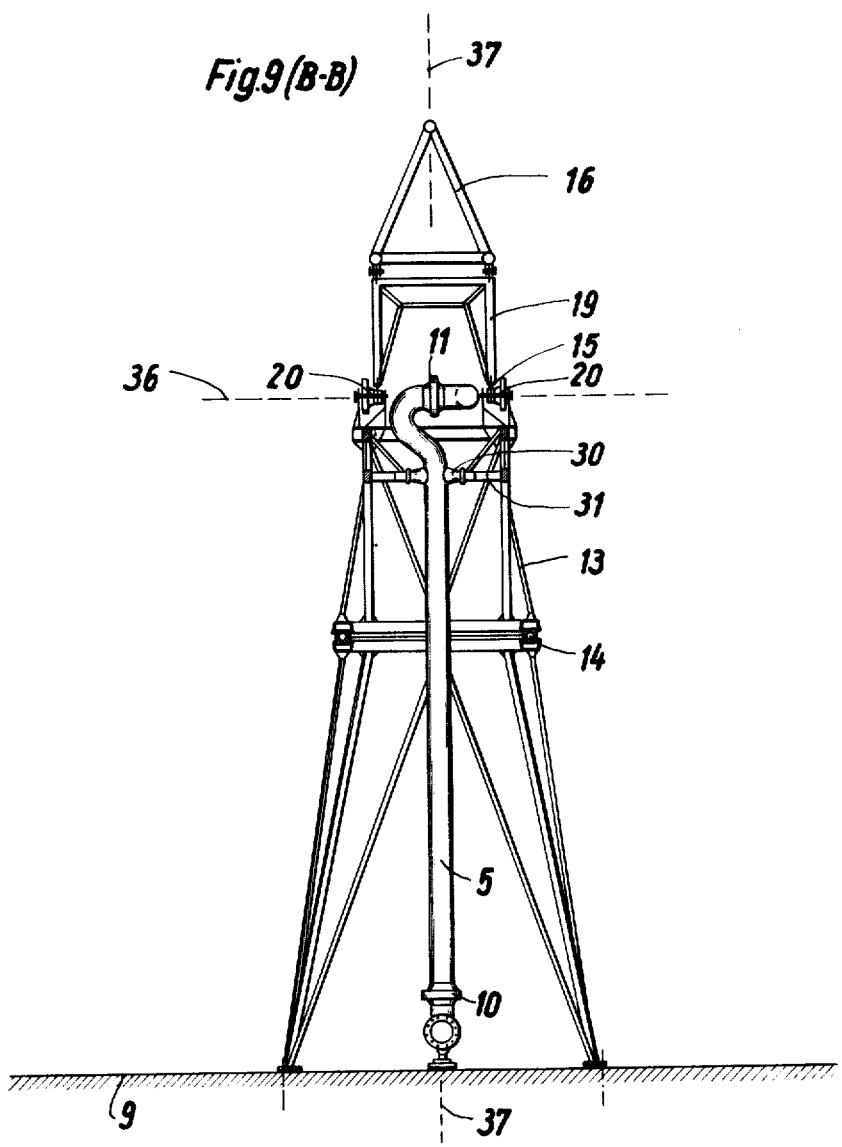

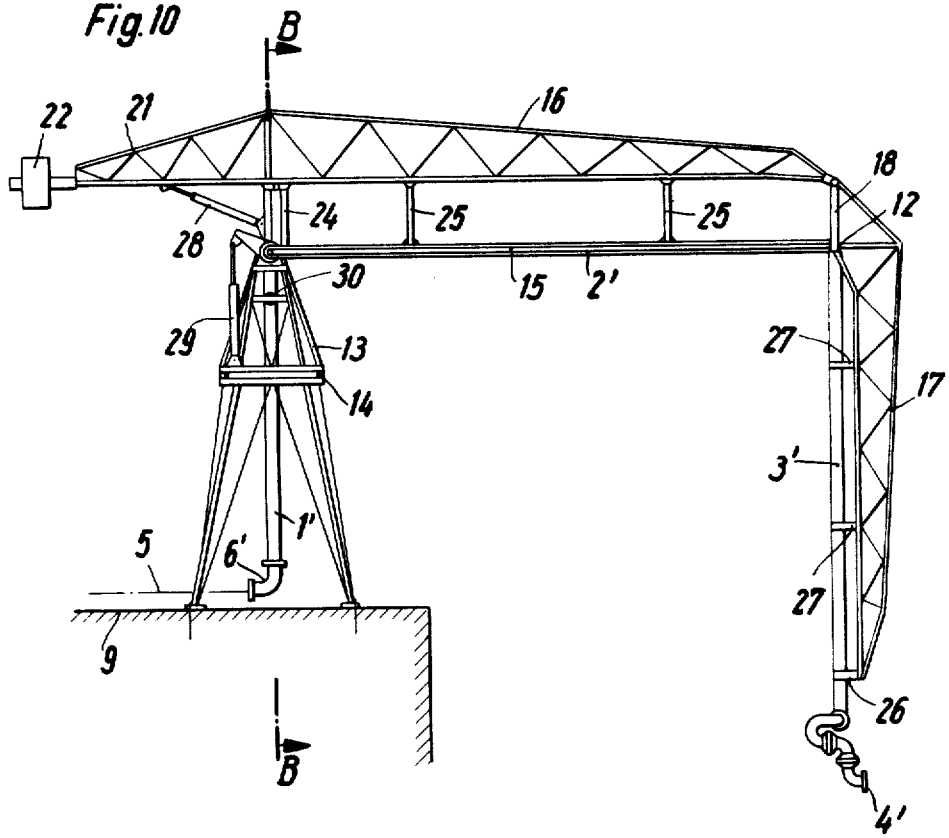
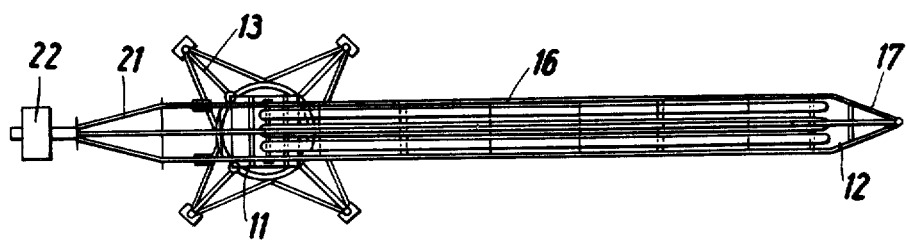

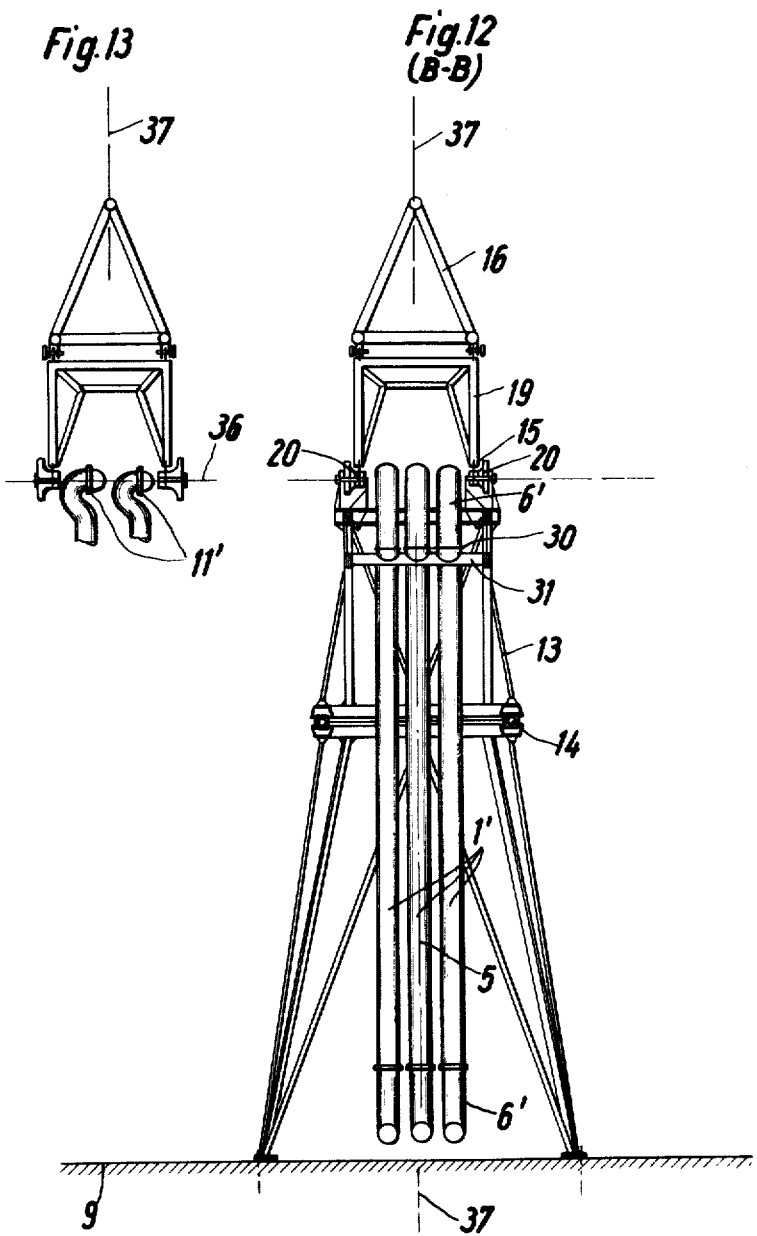

JOINTED DELIVERY EQUIPMENT FOR FLUIDS, PARTICULARLY LOW TEMPERATURE LIQUIDS

The present invention relates to crane like delivery equipment using jointed conduits for transfer of material which can be pumped, i.e., fluids. Particularly the invention relates to improvement of equipment for loading and/or unloading tankers and which is connected to a stationary pipeline. The equipment includes ascending standing piping connected to the pipeline and merging in a pivotable overhung pipe; an end pipe is suspended from the overhung pipe and carrying at its lower end means for connection to filling and drain structure. Furthermore, the equipment improved in accordance with the invention has weight balancing means on the overhung boom structure.

Delivery equipment of the type outlined above serves for connecting the inlet-outlet studs of a tanker to a stationary pipeline. The equipment serves for adapting the delivery and fluid transfer to different vessel size, to the depth of immersion and particularly to the change thereof during loading or unloading; also the tides differ and vary over a particular range. The position of the end of the suspended descending or end pipe must be particularly controlled to obtain proper operation in spite of variation in these parameters. The parameters determine essentially the lengths of ascending and of descending pipes and of the overhung boom pipe.

Equipment of this type is disclosed in German printed applications Nos. 1,182,150 and 1,431,658 and in British Pat. No. 918,575. These known devices are constructed so that the boom as a heavy load rests directly on the ascending stand pipe. The load is particular effective directly on the joint of stand pipe and boom pipe. The latter pipe is also directly subjected to bending, and the same holds true for the suspended, descending pipe. Different positions of the boom system vary the bending stress. Nevertheless, these loads on the several parts that serve as conduit requires them to be rated much stronger than necessary for the usual pressure in the piping.

It is an object of the present invention to provide jointed construction for such conduit system that is particularly suited for transfer of low temperature liquids such as liquified natural gas, having temperature of $-180°$ C. The known equipment proved unsuitable for this purpose; there are several reasons for their failing.

First of all, all parts that come in direct contact with such a liquid have to be made from very high quality steel to survive physical and chemical attacks by the liquid on the pipes. Also, due to the weight loads as acting on the pipes, i.e., the weight of the boom system, and due to additional forces, such as wind pressure, the pipes must have rather thick walls which makes them considerably heavier and more expensive than necessary in case only flow rate and fluid pressure were the determining factors for rating the pipes.

Sealing of the pivot or turning joints is another problem, as there are only few materials available which do provide sealing and are sufficiently resilient at $-180°$ C. Joints subjected to bending are particularly critical as bending tends to misalign the axes of the joint pipes resulting in a nonuniform sealing gap which, in turn, is difficult to seal tight.

Experience has shown that during operation an ice layer forms on the pipes through which liquified natural gas is pumped, the ice layer growing to 3 cm or even 5 cm thickness. The ice layer may impede or even inhibit pivoting of the pipes and adds to the weight.

Large scale delivery equipment as is used today requires hydraulic actuators for pivoting and turning of parts that have to be moved. The British Pat. No. 918,575, shows such actuators welded to the ascending, stand pipe. Generally speaking, most known equipment has the hydraulic actuators supported somewhere on the pipes. Thus, they are heat conductively connected to the cold medium and are cooled accordingly. On one hand, the actuators have to transmit considerable forces (to move the heavy parts), on the other hand, the temperatures may drop below values for which the hydraulic becomes inoperative.

In order to avoid these problems and deficiencies outlined above, it is suggested in accordance with the preferred embodiment of the invention to provide a balanced boom system having a cantilever boom pivotally supported by and extending from a tower, whereby a support arm extends down from and is pivotally suspended from the unsupported end of the boom. A pipe runs up in the tower, another pipe is supported in multiple locations in the boom, and a third pipe is individually supported in plural locations in the suspended support arm, the pipes are conductively interconnected, e.g., through turning joints. The invention calls for separation of fluid conduction and of the support structure for the conduits and weight balancing. This way, the weight bearing and balancing boom system is constructed in a manner and from materials requiring only consideration as to statics, while the conduit system can be optimized as to physical and chemical properties of the fluid, considering further pressure and rate of flow. The conduit system will bear only insignificant loads.

It is another feature of the invention to provide respectively coaxial relation as between stationary turning and pivot axes of the boom system on the one hand, and of the stationary turning and pivot axes of the pipe system on the other hand. The conduit system for the fluid is suspended in the tower and the supporting boom system, the suspension being particularly provided in the intersection of the vertical turning axis and of the horizontal pivot axis for the boom.

In addition, consideration has to be given to the extreme differences in temperatures ranging from about $+50°$ C. to $-200°$ C, resulting correspondingly in considerable changes in length of the pipes. Thus, the stand pipe that runs through the tower is suspended at its upper end from the top of the tower. A pipe length compensator is provided underneath this suspension, taking up changes in length of the stand pipe that are due to changes in temperature. The tower is biparted, the upper part permitting turning on the lower part, for turning of the boom system on a vertical axis. Horizontal twisting of the boom system is avoided as a turning joint is provided in the stand pipe underneath its suspension from the tower.

In accordance with another feature of the invention, the boom is constructed from two essentially parallely running beam or girder systems. The free ends of the beam or girder systems are interconnected by a pendulum that is a rigid extension of the suspended arm. A pivot link, frame or the like, is linked to the lower beam system at the horizontal pivot axis of the boom system, that is defined on the lower system. The pivot link structure is also pivotable connected to the upper beam system. Upper and lower beam system, pendulum support for the suspended arm and pivot link defines a parallelogram that can vary its angles and provides parallel motion upon up and down pivoting on the said horizontal pivot axis. The upper beam system is extended rearwardly and is a bending carrier arm for the counter or balancing weight at its free end. The boom pipe runs in the lower beam or girder system but is suspended from the upper girder system by swinging, pendulum type structure, disposed particularly in between the end joints of that boom pipe. This structure has the advantage that a single balancing weight can balance the boom, as will become apparent from the detailed description of the drawing.

In case of cold fluids, changes in pipe length are to be considered; boom pipe and the end pipe supported in the arm that is suspended from the free end of the boom may become shorter, while the boom and support arm retain their length as they are not cooled. Pivotability of the system must be maintained. For this, conduit and support structure are interconnected in the linkage of boom and suspended arm so that the pivot axis of the arm is coaxial with the pivot axis of the suspended arm. Conduit length compensators must be included in boom and end pipe. However, such compensators are not needed if the boom pipe (except for its stationary turning joint) is displaceably disposed in the boom, displacement to correspond to the change in length resulting from, for example, extremely low temperatures. Furthermore, pivot arms pivotally link to the respective ends of both, suspended arm and end pipe, for interconnecting them. The two pivots of the pivot arms, together with the upper turning joint for the end pipe and the upper pivot of the suspended arm for a pivot quadrilateral, of which one side is variable in length. That side is given by the turning joint end and boom pipes and by the pivot of linking the suspended arm to the lower boom girder.

The several means for suspending the conduit system is the support system could establish heat transfer path, cooling the support structure. In accordance with another feature of the invention, the suspending and connecting elements as between tower and boom on one hand and the respective pipes on the other hand, are at least partially constructed from material of low thermal conductivity. The several pipes are clad in heat insulating material in order to avoid formation of ice layers thereon adding to the weight. It was found that the structure remained substantially ice free, the insulation adding significantly less weight than the ice would.

Delivery equipment can be constructed in accordance with the principles of the invention for loading different chemically etc. agressive material. For loading of liquified natural gas large quantities per unit time are to be pumped through the system, so that loading and unloading of the tanker takes as little time as possible. However, in case of various particular agressive materials, each loading or unloading step involves usually relatively small quantities for sequentially loading small tankers or tanker trucks. Also, parallel pumping of different materials to different storage tanks on the cargo vessel may be necessary, acid in one, lye in the other. Accordingly, plural pipes are provided for the stand pipe system, for the boom piping and for the end pipe system. If there are at least two parallely running pipe systems in the equipment, at least two different fluids can be loaded and/or unloaded simultaneously Thus, there is a common boom system which is quite economical.

The plural parallel pipes are disposed side by side in common plane in the boom and also in the suspended arm. Also, the stand pipes have their respective upper ends joint with the respective ends of the boom pipes. The stand pipes hang from the top of the tower by means of swinging suspension. Hoses are connected to the lower end of the stand pipes as they may swing out of a stationary plane upon turning. Such hoses will offset the resulting change in length.

The construction features outlined above permit employment of turning joints in or near the connection between stand pipe and boom pipe, and between the latter and the end pipe. The hoses mentioned above may not be usable as occasionally fluids are pumped for which suitable hoses are not available. Thus, the hoses may better be replaced by pipe sections with turning joints, to offset changes in dimensions upon turning of the boom.

In case of plural parallel pipes, the individual pipes should be releasably anchored in the equipment to permit individual replacement. For example, duplicate pipes may not be needed any longer, or a piping made from different material has to be used. In case piping is taken out or added, the balance conditions change. Thus, the balancing weight should be made variable. Also, the length of the leverage for the weight is to be changed.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates an overall side view of a delivery crane in accordance with the preferred embodiment of the present invention;

FIG. 2 is a top elevation of FIG. 1;

FIG. 3 is a section view from plane A—A in FIG. 1;

FIG. 4 shows detail F of FIG. 1, on an enlarged scale;

FIGS. 5, 6 and 7 respectively are section views from planes D—D, C—C, E—E in FIG. 1;

FIG. 8 shows the fluid transfer section as between boom pipe and end pipe, the latter pivoted up into the horizontal;

FIG. 9 is a section view in plane B—B of FIG. 1, but on an enlarged scale;

FIG. 10 is a side view of a plural pipe delivery crane;

FIG. 11 is a top view of FIG. 11, however, without bending beam;

FIG. 12 is a section view from plane B'—B' in FIG. 10; and

FIG. 13 shows a modification of FIGS. 9 through 12, particularly as to transition between stand pipes and boom pipes.

Proceeding to the detailed description of the drawings, FIG. 1 illustrates a delivery crane that has piping to be connected, with one end of a stationary, onshore pipeline (not shown) by means of an elbow bend 6 (detail F of FIG. 4 as identified by circle F in FIG. 1). The delivery crane serves to support and establish a conduit path 5. The conduit means of the delivery equipment, and defining that path 5, includes the ascending or stand pipe 1, a pipe 2 or a boom (also called boom pipe 2) and a descending end pipe 3. Means 4 are provided at the lower end of pipe 3 for connection to the inlet-outlet facilities of a tanker.

A guide pin 7 is provided on bend 6 and slides in a guide duct 8 in vertical direction. Duct 8 is anchored to foundation 9. These latter elements are provided for positioning stand pipe 1 in the horizontal permitting expansion and contraction of pipe 1 due to temperature changes. A turning joint 10 connects bend 6 to pipe 1. An example for such turning joint is shown, for example, in copending application, Ser. No. 75,912, filed on Sept. 28, 1970.

As the joint 10 or its sealing elements may have to be removed from time to time, pin 7 can be lowered into duct 8 to the extent necessary for such removal. Maintenance is thus considerably facilitated.

Pipe 1 is actually suspended from support tower structure 13. Moreover, the tower is the basic support for all of the other equipment of the crane. Support tower 13 as a lower, stationary part and an upper part that can turn on a vertical axis, there being a slewing track ring 14 interposed. Pipe 1 is suspended from the upper, turning part of support 13. (Details of the suspension are shown in FIG. 5).

Bearing pins 30 are mounted to stand pipe 1 near the upper end thereof. Pins 30 are received in bearing sockets 31 on tower 13. Not only do these sockets carry the weight of stand pipe 1, but they transmit also turning motion of the upper part of tower 13, on a vertical axis, upon pipe 1. The turning motion is produced by a hydraulic servo motor (not shown), and is transmitted via sockets 31 and pins 30 to the turning part of pipe 1 as disposed above the turning joint 10.

A joint 11 for turning on a horizontal axis connects pipe 1 to boom pipe 2. That axis (36) is also the stationary pivot axis for the boom as a whole. Hydraulic actuators 28 and 29 pivot the heavy boom on that axis. Of course, pipe 1 must be suspended near the top of tower 13, as close as possible to upper turning joint 11 as provided between stand pipe 1 and boom pipe 2, so that changes in length (due to temperature variations) remain without influence on the position of the pivot axis.

Boom pipe 2 is connected to descending end pipe 3 by means of another turning joint 12 (see FIG. 8) also turning on a horizontal axis. Pipe 2 itself is actually supported by a boom system which is constructed as cantilever but has a rearward extension for weight balancing. The boom system includes girder structure 15–16; particularly there is an upper girder structure or beam 16 extending generally parallel to a lower girder or beam 15. The cantilever ends of beams 15 and 16 are interconnected by pivot linkage 18, while a pivot linkage 19 interconnects the beams above the tower. Beams 15 and 16, and pivot linkages 18 and 19 establish a carrier parallelogram, permitting parallel motion upon pivoting of the boom on the axis 36, which is the pivot axis of the boom on the tower. Upper girder system 16 is extended to the rear beyond connection to the tower structure. The resulting extension arm 21 carries a balancing weight 22.

FIG. 6 shows two possibilities of supporting pipe 2 in the boom defining beam or girder structure 15/16. Line 38 defines the separation plane for the two cases. To the left of line 38 there is shown structure for suspending pipe 2 in a pendulum-like fashion from upper beam structure 16. The suspension is established by arms 25, pivotally linked to both, girder and pipe, to follow angle changes of the parallelogram. In reality, the structure is, of course, symmetrically duplicated to right. The second structure, as actually shown to the right of plane 38, illustrates pipe 2 as supported by lower girder 15, there being a support element 33 permitting relative displacement, parallel to the extension of pipe 2, and between the latter and the beams 15.

A particular swing 24 supports pipe 2 close to the turning joint 11, to relieve the latter joint from the weight of pipe 2 and to secure the position of the upper end of the stand pipe 1.

The descending end pipe 3 is supported in a suspended arm structure 17 by means of a plurality of swinging support and suspension elements 27. The lower end of pipe 3 is linked to the lower end of arm structure 17 by two parallely, positioned short arms 26, each pivotally linked to both, suspended beam 17 and pipe 3. There are additional connecting elements 34 disposed on the pipe 3 for pivotal linking to cantilever suspension arms 27 that hold pipe 3.

FIG. 2 illustrates particular linkage between the free end of the boom structure and the upper end of suspended arm or beam 17. FIG. 7 shows sections through that structure and through pipe 3.

Insulation 35 isolates pipe 3 from the environment. In order to inhibit thermal conduction through the several elements 25, 27, 32 and 34, that link piping with support structure, may be made of material having low thermal conductivity.

The section view B—B in FIG. 9 illustrates further details particularly as they relate to the stationary axis 36 (horizontal) and the stationary turning axis 37 (vertical). The axis 36 is actually defined by journal pins or bolts 20 connecting support tower 13 to the anchoring end of lower cantilever girder 15. The turning axis 37 of the boom, however, is defined by the axis of turning joint 10 and by the slewing ring 14.

Another embodiment of the invention is shown in FIG. 10 et seq. The delivery equipment has three pipes as conduits for fluids and for connection to a pipeline. The basic conduits are plural stand pipes 1', plural boom pipes 2', and plural suspended pipes 3'. The latter has its lower end also provided with connection means 4', for connection to the inlet and outlet of a tanker. Line 5 denotes the fluid flow path through the equipment.

Hoses 6' provides fluid conductive connection between the several pipes. However, some or all of these hoses may be replaced by turning joints or by articulated pipe joints or the like, see for example FIG. 13.

As in FIGS. 1 through 9, the stand pipes 1' are suspended from the top of a support tower 13; pins 30 permit swinging pendulum-like suspension. Also, tower 13 is biparted by slewing ring 14 to have a lower, stationary part and an upper, turning part. The pipes 1' are also suspended from the turning part. The pins 30, as extending from the pipe 1', are received by sockets or bearings ports acting as drivers for follower action, so that the pipes 1' are turned together with the upper part of tower 13. A hydraulic servo motor (not shown) drives that turning part of the tower. The pin-receiver structure 30-31 takes up the weight of pipes 1'.

Each of the boom pipes 2', as connected respectively to descending pipes 3', is supported by a balanced boom system. This system is comprised of cantilever arm structure 15, 16, 18 and 19 as before establishing the parallelogram. There is also the balancing rearward extension 21, 22. Extension 21 is variable for variable lever arm length; also, weight 22 is variable.

A swinging-pendulum type bearing 24 for each boom pipe 2' in close proximity to turning joint 11' (FIG. 13) secures pipes 1' in their respective upper end position. Also, load relief is provided by this construction. Each descending pipe 3' is suspended in arm 17 by means displaceable, swinging suspension elements 27.

The lower ends of pipes 3' and of arm 17 are articulated. The three stand pipes 1' are particularly shown side by side in FIG. 12, otherwise this Figure corresponds to FIG. 9 in principle, as far as support structure is concerned.

The invention is not limited to the embodiments described above but all changes and modifications thereof not constituting departures from the spirit and scope of the invention are intended to be included.

We claim:

1. Delivery system for loading and unloading of tankers using a crane tower and a boom supported in cantilever configuration by the tower for pivoting on the top of the tower, the cantilever having weight balancing extension; the improvement comprising:

a support arm pivotally suspended from the end of the boom arm and having girders carried by the boom arm;

first pipe means suspended from the top of the tower and disposed for running up in the tower;

second pipe means suspended from the girders of the boom arm and supported by the boom arm in multiple spaced-apart points along the extension of the arm including support points displaced from either end of the second pipe means; and third pipe means supported in multiple, spaced-apart points in the suspended arm;

the first, second and third pipe means fluid conductively interconnected to obtain continuous, closed conduit means for fluid, there being a turning joint between first and second pipe means and a turning joint between the second and third joint means, only one thereof being secured to the boom arm for compensation of changes in length of the second pipe means due to temperature variations.

2. Delivery system as in claim 1, the tower provided for turning the boom on a vertical axis and for pivoting the boom on a horizontal axis, boom and tower disposed for the second pipe to turn and to pivot respectively on the same axes.

3. Delivery system as in claim 1, the first pipe means suspended from the top of the tower, and means on the first pipe means for compensation of length variations upon changes in temperature.

4. System as in claim 3, the first pipe means having first and second sections, there being a turning joint interconnecting the first and second sections underneath suspension from the tower.

5. System as in claim 1, the boom comprised of two parallely, disposed girders linked for parallel motion, there being an upper and a lower girder, the lower one of the two girders pivotally linked to the tower, the free ends of the two girders linked by a pendulum suspension for and rigidly extending from the suspended arm, the upper one of the two girders extended to the rear and carrying a balancing weight, the second pipe disposed in the lower girder, there being means providing pendulum suspension for the second pipe from the upper girder, acting on the pipe in between the respective joints to the first and third pipe.

6. System as in claim 1, the second pipe positioned in the boom for sliding motion due to temperature variations, the joint to the first pipe being stationary, the third pipe mounted to the suspended arm for motion relative to each other, there being pivot means provided for the mounting.

7. System as in claim 1, there being means for mounting the pipes respectively to tower, boom and arm, the means, at least partially, having low thermal conductivity.

8. System as in claim 7, the first, second and third pipe means clad in thermal insulation.

9. System as in claim 1, the pipe means each including at least two pipes running parallel to each other for establishing separate fluid paths.

10. System as in claim 9, the first, second and third pipe means, respectively, comprised of first, second and third pluralities of pipes, the pipes of the second plurality disposed in a plane, and respectively joined to the pipes of the third plurality disposed in a different plane, the pipes of the first plurality joined to the pipes of the second plurality permitting turning motion about the axis of the boom, the pipes of the first plurality being suspended from the tower, and conduit means at the lower ends of the pipes of the first plurality for compensating position changes upon turning of the pipes of the first plurality as a whole about a vertical axis.

11. System as in claim 9, the several pipes releasably disposed for individual removal.

12. System as in claim 9, the balancing weight and the effective length of the extension being adjustable.

* * * * *